(12) United States Patent
Naik et al.

(10) Patent No.: US 8,662,855 B2
(45) Date of Patent: Mar. 4, 2014

(54) INTEGRALLY WOVEN COMPOSITE FAN BLADE USING PROGRESSIVELY LARGER WEFT YARNS

(75) Inventors: Rajiv A. Naik, Glastonbury, CT (US); Steven R. Clarke, Mansfield, MA (US)

(73) Assignee: United Technologies Corporation, Hartford, CT (US)

( * ) Notice: Subject to any disclaimer, the term of this patent is extended or adjusted under 35 U.S.C. 154(b) by 711 days.

(21) Appl. No.: 12/872,346

(22) Filed: Aug. 31, 2010

(65) Prior Publication Data
US 2012/0051935 A1     Mar. 1, 2012

(51) Int. Cl.
*F01D 5/14*     (2006.01)

(52) U.S. Cl.
USPC ..... 416/230; 29/419.1; 29/889.71; 416/229 A

(58) Field of Classification Search
USPC .............. 416/224, 227 R, 229 A, 229 R, 230; 29/889.7, 889.71, 419.1
See application file for complete search history.

(56) References Cited

U.S. PATENT DOCUMENTS

| | | | |
|---|---|---|---|
| 3,671,139 A | 6/1972 | Plowman | |
| 4,916,997 A * | 4/1990 | Spain | 87/1 |
| 5,001,961 A * | 3/1991 | Spain | 87/1 |
| 5,013,216 A | 5/1991 | Bailey et al. | |
| 5,222,297 A | 6/1993 | Graff et al. | |
| 5,279,892 A * | 1/1994 | Baldwin et al. | 442/206 |
| 5,346,367 A | 9/1994 | Doolin et al. | |
| 5,392,514 A | 2/1995 | Cook et al. | |
| 5,439,353 A | 8/1995 | Cook et al. | |
| 5,645,670 A | 7/1997 | Reinfelder et al. | |
| 5,672,417 A * | 9/1997 | Champenois et al. | 442/208 |
| 5,899,241 A * | 5/1999 | David et al. | 139/408 |
| 6,003,564 A * | 12/1999 | Cahuzac et al. | 139/97 |
| 6,431,837 B1 | 8/2002 | Velicki | |
| 7,101,154 B2 | 9/2006 | Dambrine et al. | |
| 7,241,112 B2 * | 7/2007 | Dambrine et al. | 415/230 |
| 8,499,450 B2 * | 8/2013 | Naik | 29/889.71 |
| 2006/0257260 A1 * | 11/2006 | Dambrine et al. | 416/230 |
| 2011/0176927 A1 * | 7/2011 | Alexander et al. | 416/230 |
| 2011/0182743 A1 * | 7/2011 | Naik | 416/230 |
| 2011/0277869 A1 * | 11/2011 | Coupe et al. | 139/11 |
| 2011/0293828 A1 * | 12/2011 | Eberling-Fux et al. | 427/249.2 |

(Continued)

FOREIGN PATENT DOCUMENTS

| | | |
|---|---|---|
| EP | 0 341 575 A2 | 11/1989 |
| FR | 2962175 A1 * | 6/2012 |
| WO | WO 2010061140 A1 * | 6/2010 |

OTHER PUBLICATIONS

Machine translation of WO2010/061140A1 from Espacenet.*

*Primary Examiner* — Edward Look
*Assistant Examiner* — Christopher R Legendre
(74) *Attorney, Agent, or Firm* — Kinney & Lange, P.A.

(57) ABSTRACT

A composite blade includes a preform and a binder. The preform is a preform of yarns woven in three-dimensions and has a tip region, a root region and an intermediate region. The intermediate region is positioned between the tip region and the root region. The yarns comprise warp yarns and weft yarns. The warp yarns form a longitudinal axis. The weft yarns are positioned at a 90 degree angle to the warp yarns. The weft yarns increase in yarn size as determined by filament count along the longitudinal axis to change the thickness of the preform. The binder maintains the relative positions of the preform yarns.

20 Claims, 6 Drawing Sheets

(56) References Cited

U.S. PATENT DOCUMENTS

2011/0311368 A1* 12/2011 Coupe et al. ............... 416/241 A
2012/0051935 A1* 3/2012 Naik et al. .................... 416/230
2012/0055609 A1* 3/2012 Blanchard et al. ......... 156/89.11
2013/0017094 A1* 1/2013 Coupe et al. .................. 416/230
2013/0089429 A1* 4/2013 Nunez et al. .................. 416/230
2013/0101429 A1* 4/2013 Roussille et al. ............. 416/230
2013/0108422 A1* 5/2013 Coupe et al. ............... 415/182.1
2013/0243603 A1* 9/2013 Naik ............................. 416/230

* cited by examiner

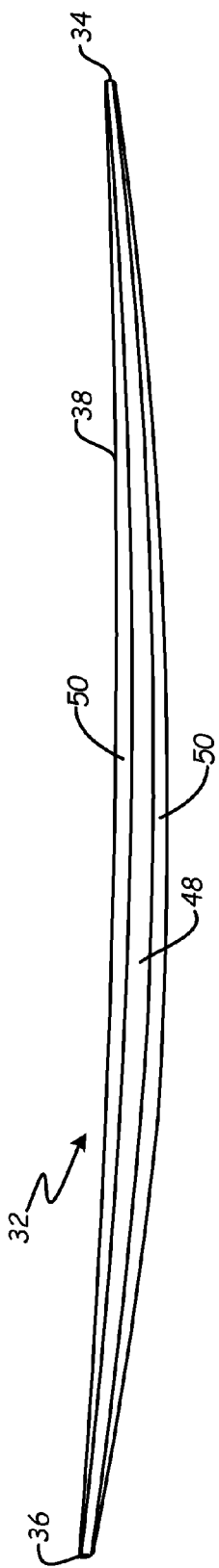
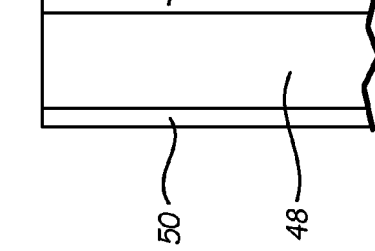
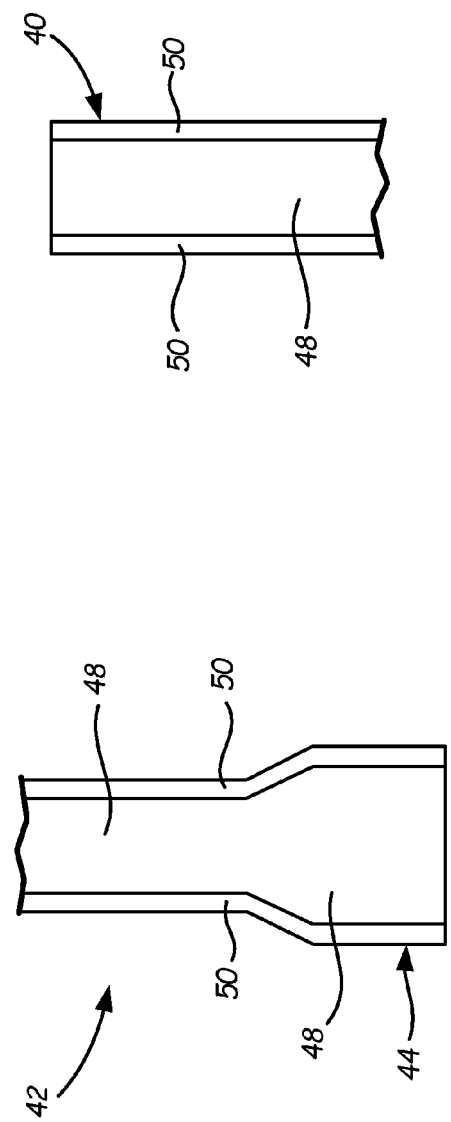

INTEGRALLY WOVEN COMPOSITE FAN BLADE USING PROGRESSIVELY LARGER WEFT YARNS

BACKGROUND

Composite materials offer potential design improvements in gas turbine engines. For example, in recent years composite materials have been replacing metals in gas turbine engine fan blades because of their high strength and low weight. Most metal gas turbine engine fan blades are titanium. The ductility of titanium fan blades enables the fan to ingest a bird and remain operable or be safely shut down. The same requirements are present for composite fan blades.

A composite airfoil has a root, which connects to the fan mechanism, and a tip opposite the root. A composite airfoil for a turbine engine fan blade is typically designed with a divergent root portion known as a dovetail root. The thickness of the airfoil greatly changes over a short length at the dovetail root. The dovetail root enables the airfoil to withstand typical operational loads from rotation and bending and loads from foreign object strikes.

The composite airfoil can have a sandwich construction with a three-dimensional woven core at the center and two-dimensional filament reinforced plies or laminations on either side. To form the composite airfoil, individual two-dimensional laminations are cut and stacked in a mold with the woven core. The woven core extends from the root to the tip of the airfoil and the plies are stacked on either side of the woven core to form the desired exterior surface profile. The mold is injected with a resin using a resin transfer molding process and cured.

Historically, the woven core has had an approximately uniform thickness over its length, and the dovetail root has been formed by laying-up plies at the dovetail root to achieve the desired thickness. Thus, there are more plies located at the root than are located at the tip. In one example, 100-200 plies are stacked at the root to achieve the desired thickness while less than 20 plies are present at the tip.

A ply drop is located at the end of each ply. Previous designs resulted in a large number of ply drops along the length of the blade due to the large difference in the number of plies at the root compared to the tip. Ply drops are undesirable because they can be initiation sites for damage and cracks. The weakest region for laminated composites is the interlaminar region between the laminates. High interlaminar shear stresses, such as from operational loads and foreign object strikes, in a laminated composite can cause delamination that compromises the structural integrity of the structure.

SUMMARY

A composite blade includes a preform and a binder. The preform is a preform of yarns woven in three-dimensions and has a tip region, a root region and an intermediate region. The intermediate region is positioned between the tip region and the root region. The yarns comprise warp yarns and weft yarns. The warp yarns form a longitudinal axis. The weft yarns are positioned at a 90 degree angle to the warp yarns. The weft yarns increase in yarn size as determined by filament count along the longitudinal axis to change the thickness of the preform. The binder maintains the relative positions of the yarns.

BRIEF DESCRIPTION OF THE DRAWINGS

FIG. 3a is a cross-sectional view of the composite fan blade of FIG. 2 taken along line 3a-3a.

FIG. 3b is a cross-sectional view of a root region of the composite fan blade of FIG. 2 taken along line 3b-3b.

FIG. 3c is a cross-sectional view of a tip region of the composite fan blade of FIG. 2 taken along line 3c-3c.

FIG. 4b is an enlarged cross-sectional view of a portion of a root of the preform of FIG. 4a.

FIG. 4c is an enlarged cross-sectional view of a portion of an intermediate region of the preform of FIG. 4a.

DETAILED DESCRIPTION

Figure 1:
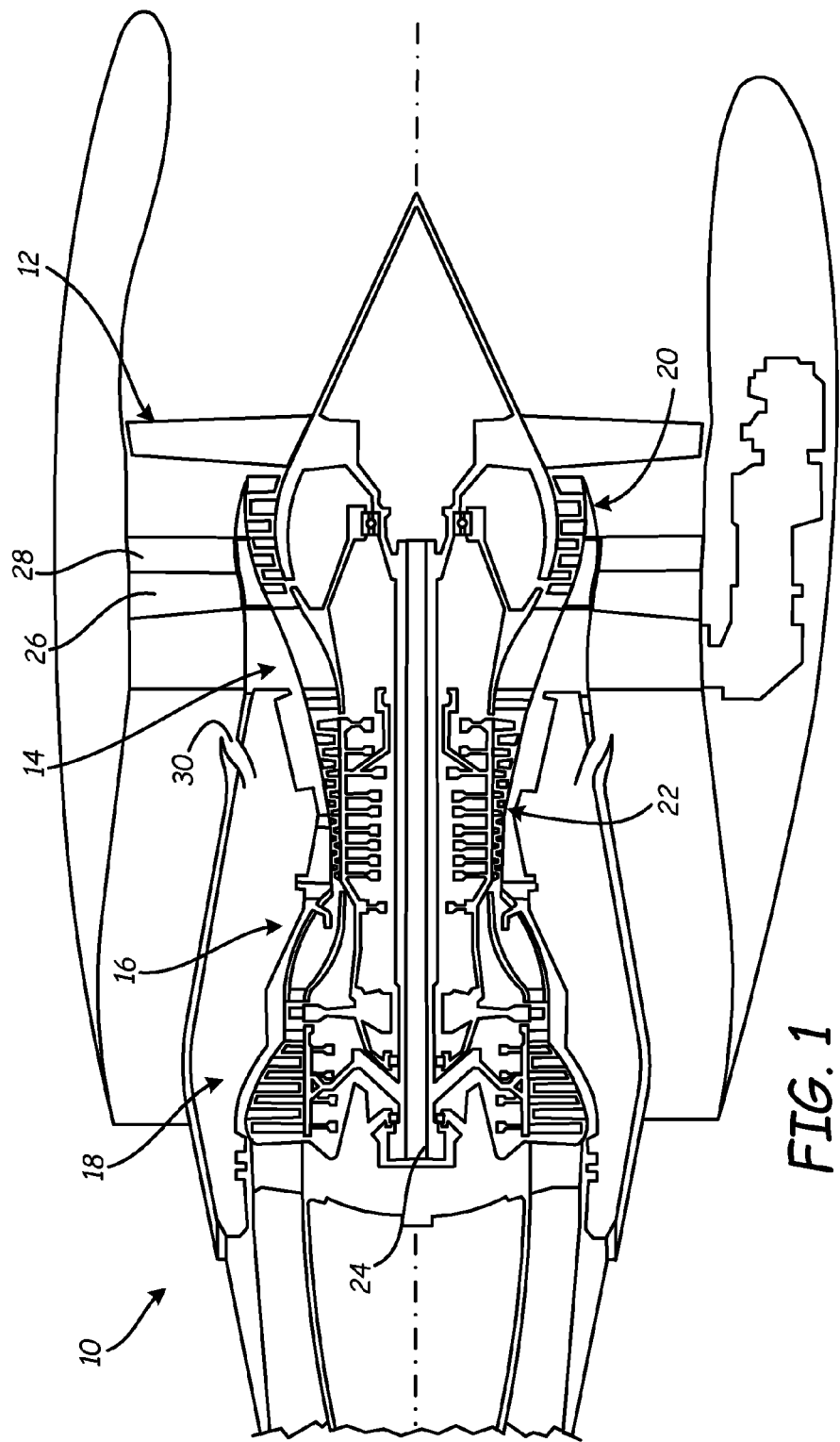
FIG. 1 is a cross-sectional view of a gas turbine engine having a turbofan.

FIG. 1 is a cross-sectional view of gas turbine engine 10, which includes turbofan 12, compressor section 14, combustor section 16 and turbine section 18. Compressor section 14 includes low-pressure compressor 20 and high-pressure compressor 22. Air is taken in through fan 12 as fan 12 spins. A portion of the inlet air is directed to compressor section 14 where it is compressed by a series of rotating blades and vanes. The compressed air is mixed with fuel, and then ignited in combustor section 16. The combustion exhaust is directed to turbine section 18. Blades and vanes in turbine section 18 extract kinetic energy from the exhaust to turn shaft 24 and provide power output for engine 10.

The portion of inlet air which is taken in through fan 12 and not directed through compressor section 14 is bypass air. Bypass air is directed through bypass duct 26 by guide vanes 28. Then the bypass air flows through opening 30 to cool combustor section 16, high-pressure compressor 22 and turbine section 18.

Figure 2:
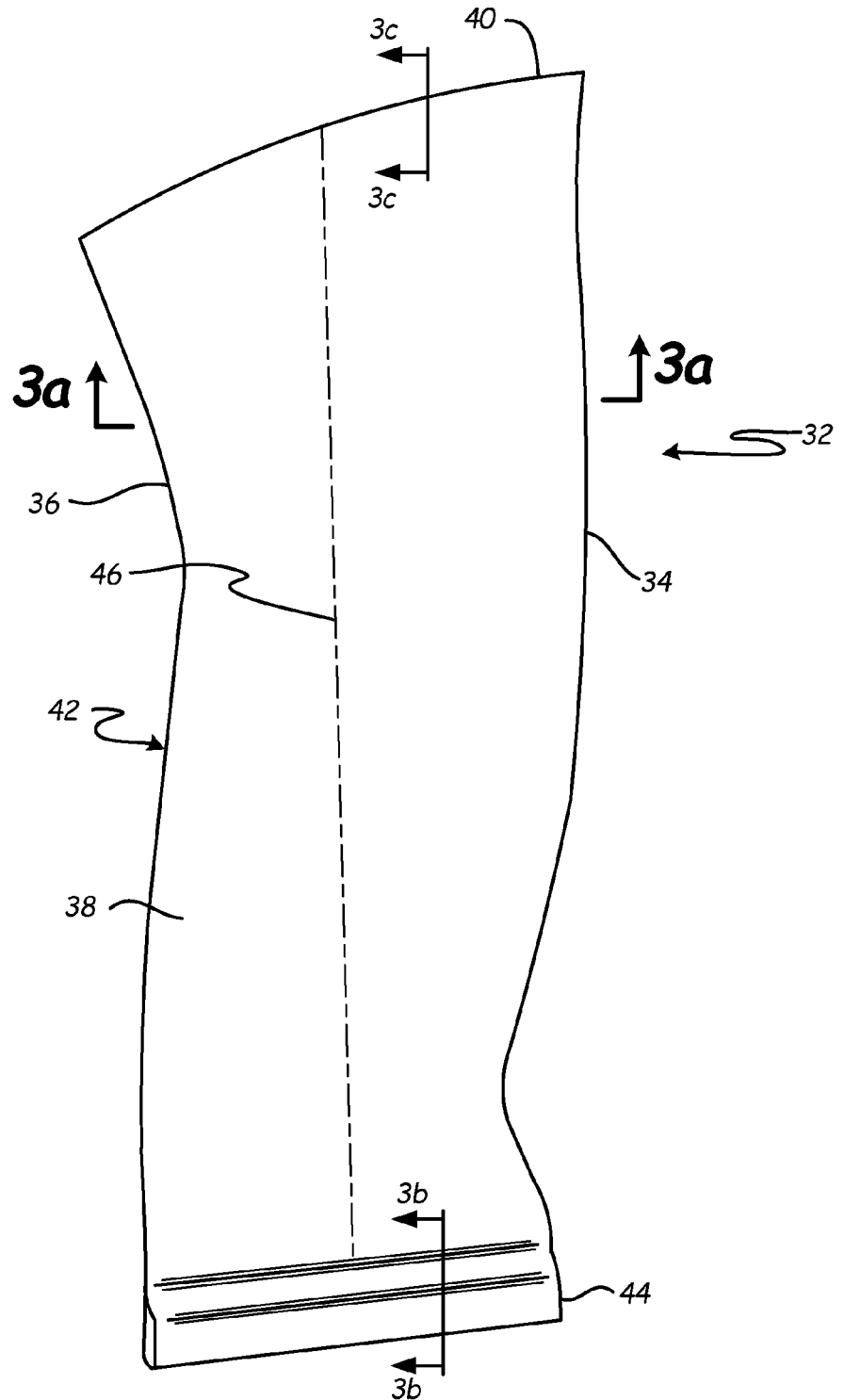
FIG. 2 is a perspective view of a composite fan blade for the turbofan.

Fan 12 includes a plurality of composite blades 32. FIG. 2 illustrates one composite blade 32, which includes leading edge 34, trailing edge 36, pressure side 38, suction side (not shown), tip 40, intermediate region 42, root 44 and longitudinal or spanwise axis 46. Root 44 is opposite tip 40, and intermediate region 42 is between root 44 and tip 40. Longitudinal axis 46 extends from root 44 to tip 40. The span of preform 48 is generally defined along longitudinal axis 46.

FIGS. 3a, 3b and 3c are cross-sectional views of composite blade 32 taken along line 3a-3a, line 3b-3b and line 3c-3c, respectively. As shown, composite blade 32 includes preform 48 and laminate sections 50. Preform 48 is a three-dimensional woven core formed from a plurality of yarns as described further below. Preform 48 extends the spanwise length of composite blade 32 from root 44 to tip 40. Preform 48 also extends the chordwise width of composite blade 32 from leading edge 34 to trailing edge 36. The shape of preform 48 generally follows the shape of blade 32.

Laminate sections 50 are positioned on either side of preform 48. Each laminate section 50 comprises a plurality of stacked airfoil plies, as is known in the art. Airfoil plies are two-dimensional fabric skins. Elongated fibers extend through the airfoil plies at specified orientations to give the airfoil plies strength. For clarity, the individual airfoil plies of laminate sections 50 are not shown in the figures.

FIG. 3b illustrates the dovetail shape of root 44. Dovetail root 44 has a divergent shape such that root 44 is thicker than intermediate region 42 and tip 40. Composite blade 32 (and thus preform 48) is connected to the fan mechanism of turbofan 12 by root 44. The additional thickness of root 44 enables composite blade 32 to withstand forces from standard operation and from foreign object impacts. Laminate sections 50 can extend the length of root 44 as shown. Alternatively, laminate sections 50 can end before root 44 so that root 44 is formed only by preform 48.

To form composite blade 32, preform 48 and laminate sections 50 are stacked in a mold, injected with resin and cured. The airfoil plies of laminate sections 50 tailor the surface of preform 48 to form the exterior surface profile of composite blade 32. The airfoil plies also provide strength. Depending on the design, laminate sections 50 are not required to be present at root 44. Root 44 of preform 48 can be tailored to a desired thickness without the addition of laminate sections 50.

The yarns of preform 48 are formed from bundles of fibers. Example fibers for the yarns of preform 48 include but are not limited to graphite fibers, glass fibers, silicon carbide fibers and boron fibers and combinations thereof. Example resins include but are not limited to epoxy resins and epoxy resins containing additives such as rubber particulates. Alternatively, vapor deposition can be used to deposit a ceramic matrix on the yarn of preform 48 in place of the resin.

Figure 4A:
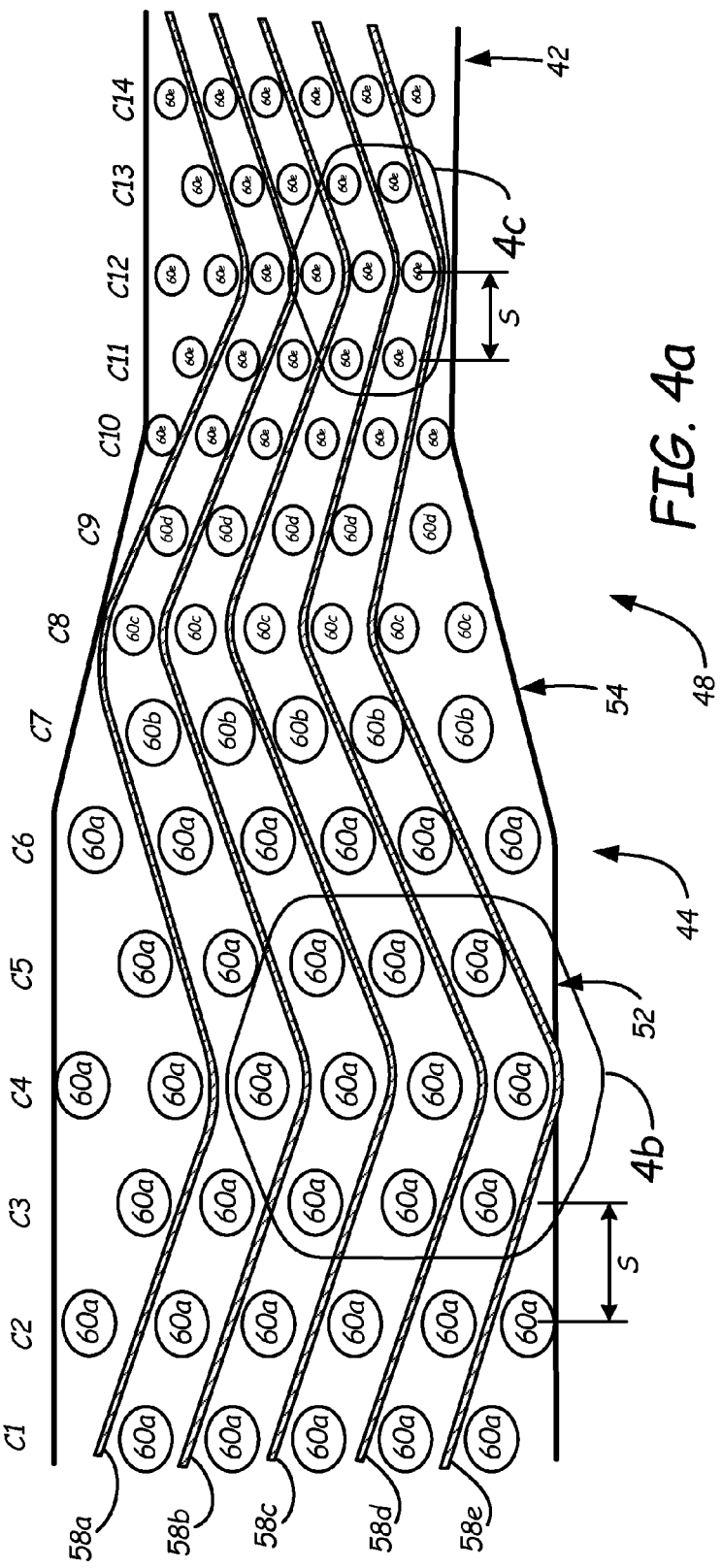
FIG. 4a is an enlarged cross-sectional view of a preform for the composite fan blade.

FIG. 4a is an enlarged cross-sectional view of a portion of preform 48 extending from root 44 (having straight region 52 and divergent or tapered region 54) to intermediate region 42. Preform 48 includes warp yarns 58 and weft yarns 60. As described above, root 44 of preform 48 is thicker than intermediate region 42 and tip 40. Tapered region 54 of root 44 transitions preform 48 from the thicker root 44 to the thinner intermediate region 42.

The thickness of preform 48 rapidly changes in tapered region 54. In one example, root 44 is between about 5.1 cm (2 inches) and about 7.6 cm (3 inches) thick, intermediate region 42 is about equal to or less than 2.5 cm (1 inch) thick and tapered region 54 is about 2.5 cm (1 inch) to about 3.8 cm (1.5 inches) long. In another example, the change in thickness of preform 48 per unit length of preform 48 is between about 0.5 cm per cm (0.5 inches per inch) and about 2.5 cm per cm (2.5 inches per inch).

Preform 48 is a three-dimensional woven core containing a plurality of woven yarns. Preform 48 is formed by three-dimensionally weaving warp yarns 58a, 58b, 58c, 58d and 58e (referred to generally as warp yarns 58) and weft yarns 60a, 60b, 60c, 60d and 60e (referred to generally as weft yarns 60). Warp yarns 58 extend in the longitudinal (or spanwise) direction of preform 48. Weft yarns 60 are placed at a 90 degree angle to the direction of warp yarns 58 and are aligned in the chordwise direction of preform 48.

Weft yarns 60 are shown distributed in fourteen columns (C1-C14). Weft yarns 60 have a staggered configuration such that the odd numbered columns contain five weft yarns 60 and the even numbered columns contain six weft yarns 60. Warp yarns 58 interlock weft yarns 60 with a layer-to-layer angle interlock weave. Alternatively, the weaving pattern can be a through-thickness angle interlock weave. In the weaving pattern shown, warp yarns 58 interlock with every fifth weft yarn column in the spanwise direction. For example, warp yarn 58a is woven from the top of the first weft yarn 60c from the top of column C8 to under the second weft yarn 60a from the top of column C4 over the length of four columns.

Warp yarns 58 and weft yarns 60 can be woven on a loom. In the weaving process, warp yarns 58 are fed through hooks that extend from the head of the loom. The head independently controls the vertical motion of each hook. Weft yarns 60 are passed through warp yarns 58 during the weaving process. The motion of the hooks determines the weave pattern. Preform 48 is integrally woven as a single three-dimensional piece. Preform 48 is not comprised of a plurality of separate layers that are interwoven.

FIG. 4a is a cross-sectional view of only one plane of warp yarns 58. The weave pattern illustrated in FIG. 4a comprises four repeating planes of warp yarns 58 arranged along the chordwise axis of preform 48. In each plane, warp yarns 58 are shifted by five columns compared to the previous warp yarn plane. Thus, the interlocking of warp yarns 58 and weft yarns 60 occurs at different locations in each warp yarn plane.

Warp yarns 58 have uniform yarn size as determined by filament count throughout preform 48. It is noted that in an untensioned state, the yarn size is proportional to the diameter of warp yarns 58. The larger the yarn size, the larger the diameter of warp yarns 58. During the weaving process, warp yarns 58 can become elliptical in cross-sectional shape or may have a non-circular cross-sectional shape. As used in this disclosure, the diameter of warp yarns 58 refers to the diameter of warp yarns 58 prior to the weaving process. It is recognized that warp yarns 58 after the weaving process may not have a circular cross-sectional shape. The number of warp yarns 58 is also constant throughout preform 48. For example, the plane shown in FIG. 4a contains five warp yarns 58 extending the length of preform 48 from root 44 to intermediate region 42. For each plane of preform 48, root 44 and intermediate region 42 have the same number of warp yarns 58 although the number of warp yarns 58 between planes can differ. The constant size and number of warp yarns 58 simplifies manufacturing.

The number of weft yarns 60 is also constant throughout preform 48. As discussed above, weft yarns 60 are arranged in alternating columns of five and six weft yarns 60. These alternating columns form column units that are repeated the spanwise length of preform 48. For example, columns C1 and C2 form one column unit, columns C3 and C4 form a second column unit and so forth. The same alternating column pattern is present in the spanwise length of preform 48 so that root 44 and intermediate region 42 contain the same repeating column units and the same number of weft yarns 60 per column unit.

Weft yarns 60 throughout preform 48 do not have uniform yarn sizes as determined by filament count. The weft yarn size is changed over the spanwise length of preform 48 to adjust the thickness of preform 48. Each weft yarn 60 has a constant filament count along its length and weft yarns 60 located in the same column have the same yarn size and filament count. The filament counts of weft yarns 60 are varied between columns. That is, the filament counts or yarn sizes of weft yarns 60 are varied in the spanwise direction of preform 48.

As shown, weft yarns 60a of straight region 52 have a larger yarn size than weft yarns 60e of intermediate region 42. The difference in yarn sizes resulted in straight region 52 being thicker than intermediate region 42. The yarn sizes of weft yarns 60b, 60c, 60d and 60e in tapered region 54 are varied by column to create the divergent shape of root 44. As described above, root 44 is significantly thicker than intermediate region 42 and tip 40. Tapered region 54 transitions the thickness of preform 48 over a short length. Weft yarns 60b, 60c, 60d and 60e are arranged in successive columns such that the yarn sizes increase with increasing distance from intermediate region 42. This arrangement creates tapered region 54.

In one example, weft yarns 60 of eight different yarn sizes were used to weave preform 48. In this example, intermediate region 42 was formed with graphite fiber weft yarns 60 having a yarn size of 24,000 filaments, the yarn size was then increased to 30,000 filaments, 36,000 filaments, 42,000 filaments, 48,000 filaments, 54,000 filaments, 72,000 filaments and finally to 84,000 filaments in successive columns, such that root 44 contained weft yarns 60 with a yarn size of 84,000 filaments. Graphite fiber warp yarns 58 of 48,000 filaments interlocked weft yarns 60. The graphite fibers had a diameter of about 5 microns. The larger yarn sizes of weft yarns 60 in root 44 increased the thickness of root 44, and the gradual increase in yarn size of weft yarns 60 produced a gradual taper in tapered region 54.

Columns C1-C14 (and thus weft yarns 60) are equally spaced apart by space S. Equally spacing weft yarns 60 enables warp yarns 58 to be pulled at a constant rate and weft yarns 60 to be inserted through warp yarns 58 at a constant rate regardless of the yarn size. This simplifies the manufacturing process.

Equally spacing columns C1-C14 results in an increase in the percent volume occupied by weft yarns 60 as the yarn size increases. Therefore, weft yarns 60 occupy a greater volume percentage in root 44 than in intermediate region 42. In one example, weft yarns 60 occupy 60% by volume and warp yarns 58 occupy 40% by volume of straight region 52 of root 44, and weft yarns 60 occupy 30% by volume and warp yarns occupy 70% by volume of intermediate region 42. Increasing the volume percentage of weft yarns 60 increases the chordwise stiffness and strength. Thus, the chordwise stiffness of root 44 increases from transition region 54 to straight region 52. The increased chordwise stiffness of root 44 provides a more rigid chordwise blade. The increased chordwise stiffness of root 44 also improves the ability of the blade, specifically transitional region 54 of the blade, to withstand torsional stresses from normal operation and stresses caused by impact from foreign objects.

Figure 4B:
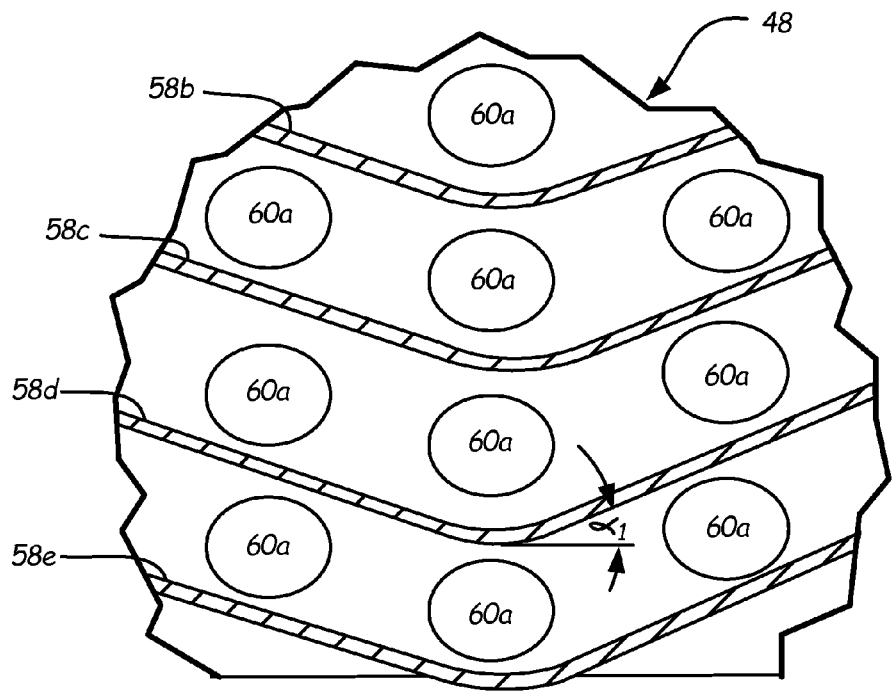
Figure 4C:
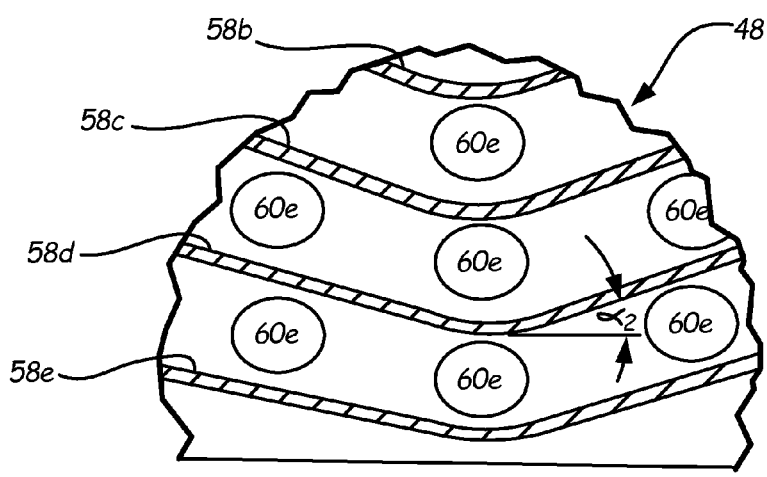

Varying the yarn size of weft yarns 60 also changes the angle warp yarns 58 form through the thickness of preform 48. The through-thickness angle is defined as the angle formed between warp yarn 58 and a horizontal axis. FIG. 4b is an enlarged view of a portion of straight region 52 of root 44, and FIG. 4c is an enlarged view of a portion of intermediate region 42. As shown in FIG. 4b, warp yarn 58d forms through-thickness angle $\alpha_1$ in straight region 52. As shown in FIG. 4c, warp yarn 58d forms through-thickness angle $\alpha_2$ in intermediate region 42. Warp yarn 58d must weave around weft yarn 60a in straight region 52 which is larger than weft yarn 60e of intermediate region 42. The difference in yarn sizes causes through-thickness angle $\alpha_1$ to be larger than through-thickness angle $\alpha_2$. In one example, through-thickness angle $\alpha_1$ is between about 30 degree and about 40 degrees and through-thickness angle $\alpha_2$ is between about 6 degrees and about 7 degrees.

The through-thickness angles of warp yarns 58 affect the physical properties of the blade. A larger through-thickness angle results in higher through-thickness strength and stiffness and interlaminar strength. Thus, the through-thickness stiffness and strength and the interlaminar strength is increased in root 44. This improves the ability of composite blade 32 to withstand stresses from operation and foreign object strikes.

Preform 48 has a uniform weave pattern while providing the desired taper in root 44. A uniform weave pattern means that the same weave pattern is used in every part of preform 48. The uniform weave pattern maintains an integrated structure. The uniform weave pattern of preform 48 also improves the ease of manufacturing preform 48. The uniform weave pattern of preform 48 eliminates complications associated with forming transitions between different weaves. Using the same weave pattern throughout preform 48 enables the use of existing looms to weave preform 48. Preform 48 uses the same weave pattern throughout.

Automatic weaving also reduces manual labor. Weaving preform 48 with tapered region 54 eliminates manually laying up hundreds of airfoil plies to form the dovetail root. Manual lay-up is labor and time intensive. Manual labor also requires designing and trimming airfoil plies during lay-up. Automatically weaving reduces costs and reduces manufacturing time.

Preform 48 is formed by weaving a constant number of warp yarns 58. As described earlier, warp yarns 58 are fed through independently mechanically controlled hooks attached to the head of the loom. The loom head can only accommodate a limited number of yarns. The number of warp yarns 58 a loom can accommodate varies depending on the loom. Some looms can accommodate up to about 2,000 yarns while mega-capacity looms can accommodate up to about 10,000 yarns. The capacity of the loom limits the number of yarns that can be woven and the size of preform 48 created.

The capacity of the loom limits the number of warp yarns 58 that can be used to form preform 48 as a limited number of hooks extend from the head of the loom. One skilled in the art will recognize that the loom also limits the number of weft yarns 60 that can be used. The number of warp yarns 58 and weft yarns 60 must be calculated so that all warp yarns 58 and weft yarns 60 interlock as required by the weave pattern. The addition of additional weft yarns 60 without increasing warp yarns 58 results in weft yarns 60 not properly interlocked with warp yarns 58.

Preform 48 having dovetail shaped root 44 is formed using a constant number of weft yarns 60 and a constant number of warp yarns 58 by increasing the yarn sizes of weft yarns 60 arranged in successive columns. Gradually increasing the yarn size of weft yarns 60 produces tapered region 54 between two regions with a large thickness differential while maintaining a constant number of weft yarns 60 and warp yarns 58. Additional weft yarns 60 or warp yarns 58 are not added to provide the additional thickness of tapered region 54 and straight region 52 of root 44. Maintaining a constant number of warp yarns 58 and weft yarns 60 assists manufacturing and prevents exceeding the warp yarn capacity of the loom.

The yarn sizes as determined by the filament count of weft yarns 60 and warp yarns 58, the number of weft yarns 60 and warp yarns 58, the spacing between weft yarns 60, the spacing between warp yarns 58, the weave pattern and the repetition of the warp yarn planes are provided for example only. Various yarn sizes of weft yarns 60 and warp yarns 58, number of weft yarns 60 and warp yarns 58 and weaving patterns can be used without departing from the scope of this invention.

Figure 5:
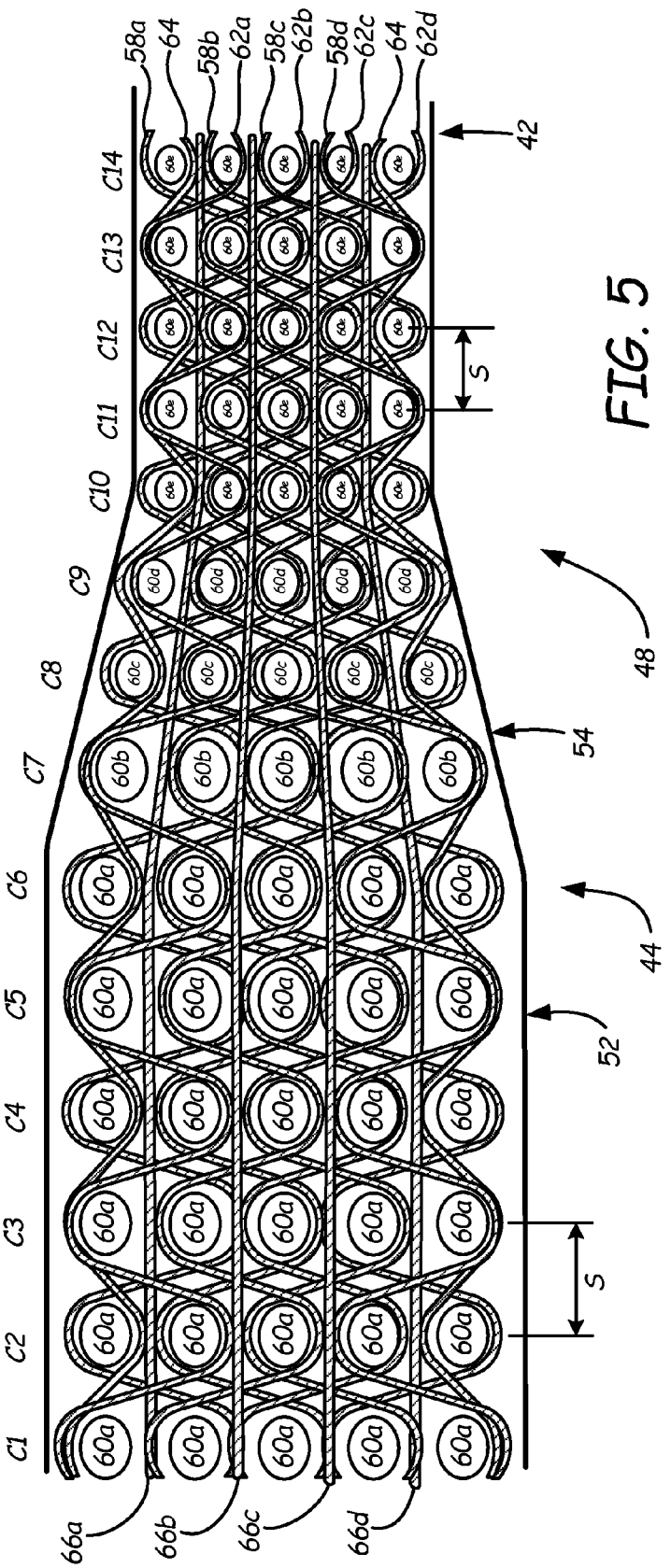
FIG. 5 is an enlarged cross-sectional view of a preform for the composite fan blade having an alternative weave pattern.

Another example weave pattern is shown in FIG. 5. Preform 48 of FIG. 5 contains warp yarns 58a, 58b, 58c and 58d (referred to generally as warp yarns 58), warp yarns 62a, 62b, 62c and 62d (referred to generally as warp yarns 62), surface weaver yarns 64, filler yarns 66 and weft yarns 60a, 60b, 60c, 60d and 60e (referred to generally as weft yarns 60). Yarns 58, 62, 64 and 66 extend in the longitudinal (or spanwise) direction of preform 48. Weft yarns 60 are placed at a 90 degree angle to the direction of warp yarns 58 and 62, surface weaver yarns 64 and filler yarns 66 and are aligned in the chordwise direction of preform 48. Columns C1-C14 contain an equal number of weft yarns 60.

Warp yarns 58 and 62 and surface weaver yarns 64 are woven with weft yarns 60 to interlock the yarns. Surface weaver yarns 64 are needed in this non-staggered pattern to interlock weft yarns 60 along the edges of preform 48.

Filler yarns 66 extend between weft yarns 60. Filler yarns 66 do not interlock with weft yarns 60. One skilled in the art will recognize that yarns 58, 62, 64 and 66 extend through separate warp yarn planes. A single warp yarn plane contains only one of yarns 58, 62, 64 and 66.

As described above with respect to FIG. 4a, the yarn size as determined by filament count of weft yarns 60 varies between columns. The yarn size of weft yarns 60 is larger in root 44 than in intermediate region 42. The gradual increase of weft yarn size creates the tapered shape of root 44. The yarn sizes of warp yarns 58 are uniform. Similarly, the yarn sizes of warp yarns 62, the yarn sizes of surface weaver yarns 64 and the yarn sizes of filler yarns 66 are uniform.

Although the weft yarn size was adjusted to form a dovetail root in preform 48, the weft yarn size can be adjusted to change the thickness of preform 48 at any location. In one example, the weft yarn sizes are adjusted to change the thickness of preform 48 between about 0.5 cm per cm of length of preform 48 and about 2.5 cm per cm of length of preform 48, where length is defined along the spanwise axis of preform 48.

While the invention has been described with reference to an exemplary embodiment(s), it will be understood by those skilled in the art that various changes may be made and equivalents may be substituted for elements thereof without departing from the scope of the invention. For example, columns C1-C14 can be unequally spaced apart by changing the rate at which warp yarns 58 are pulled. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming a composite blade, the method comprising:
    three-dimensionally weaving warp yarns and weft yarns to form a three-dimensional preform, wherein the warp yarns form a longitudinal axis and wherein the weft yarns are arranged in increasing or decreasing yarn size as determined by filament count along the longitudinal axis to vary the thickness of the preform and wherein the preform has a substantially uniform weave pattern and a substantially constant number of weft yarns per column unit throughout the preform;
    inserting the preform into a mold;
    injecting the mold with resin for maintaining the relative positions of the yarns; and
    curing the resin.

2. The method of claim 1, wherein the preform has a tip and a root and wherein the weft yarns of the root are arranged to increase in yarn size with increasing distance from the tip.

3. The method of claim 2, wherein the root has a dovetail taper.

4. The method of claim 1, wherein the preform has a uniform weave pattern throughout.

5. A composite blade comprising:
    a preform of yarns woven in three-dimensions, the preform having a tip region, a root region and an intermediate region positioned between the tip region and the root region, and the yarns comprising:
        warp yarns forming a longitudinal axis of the preform; and
        weft yarns positioned at a 90 degree angle to the warp yarns, wherein the weft yarns increase in yarn size as determined by filament count along the longitudinal axis to change the thickness of the preform; and
    a binder maintaining the relative positions of the preform yarns, wherein the preform has a substantially uniform weave pattern and a substantially constant number of weft yarns per column unit throughout the preform.

6. The composite blade of claim 5, wherein the root region of the preform has a divergent shape such that the thickness of the preform increases in the root region with increasing distance from the tip region, and wherein the yarn size of the weft yarns increases in the root region along the longitudinal axis with increasing distance from the tip region.

7. The composite blade of claim 6, wherein the root region has a dovetail taper shape.

8. The composite blade of claim 5, wherein the yarn size of the weft yarns in the root region are greater than the yarn size of the weft yarns in the intermediate region.

9. The composite blade of claim 5, wherein the yarn size of the weft yarns in the root region are greater than a yarn size as determined by filament count of the warp yarns in the root region.

10. The composite blade of claim 5, wherein each warp yarn has a yarn size as determined by filament count equal to a first value.

11. The composite blade of claim 5, wherein the root region, the intermediate region and the tip region of the preform have a first weave pattern.

12. The composite blade of claim 5, wherein the weft yarns are uniformly spaced along the longitudinal axis.

13. The composite blade of claim 5, wherein the root region and the intermediate region contain repeating column units of weft yarns, and wherein the root region contains a same number of weft yarns per column unit as the intermediate region.

14. The composite blade of claim 5, wherein in each plane of the composite blade, the root region contains a same number of warp yarns as the intermediate region.

15. The composite blade of claim 5, wherein a portion of the preform changes between about 0.5 cm and about 2.5 cm in thickness per cm of length.

16. A composite blade comprising:
    a preform of yarns woven in three-dimensions with a substantially uniform weave pattern, the preform having a tip, a root and an intermediate region positioned between the tip and the root, and the yarns comprising:
        warp yarns forming a spanwise axis of the preform; and
        weft yarns positioned at a 90 degree angle to the warp yarns, wherein the weft yarns vary in yarn size as determined by filament count along the spanwise axis to change the thickness of the preform and wherein the number of weft yarns per column unit is substantially constant throughout the preform;
    laminate sections located on either side of the preform and defining the outer surface of the blade and
    a binder maintaining the relative positions of the preform yarns.

17. The composite blade of claim 16, wherein the diameter of the weft yarns increases along the spanwise axis with increasing distance from the tip.

18. The composite blade of claim 16, wherein the weft yarns are uniformly spaced in the spanwise direction.

19. The composite blade of claim 16, wherein the preform has a uniform weave pattern extending from the root to the tip.

20. The composite blade of claim 16, wherein the weft yarns include at least one of the following: graphite fibers, silicone carbide fibers, glass fibers and boron fibers and combinations thereof.

* * * * *